May 3, 1932.  F. GÖTZ  1,857,017

TRANSMISSION MECHANISM

Filed Dec. 5, 1929

Inventor:-
Frantisek Götz
by E. S. Wendenall
Atty.

Patented May 3, 1932

1,857,017

UNITED STATES PATENT OFFICE

FRANTIŠEK GÖTZ, OF PILSEN, CZECHOSLOVAKIA

TRANSMISSION MECHANISM

Application filed December 5, 1929, Serial No. 411,962, and in Czechoslovakia December 11, 1928.

The invention relates to a centrifugal fluid clutch particularly adapted for high speed drive mechanisms, the essential features residing in the construction of the fluid chamber. The invention has for its object a clutch employing a maximum quantity of fluid and thus having the smallest possible dimensions, but which transmits the maximum amount of work without being greatly reduced in efficiency due to wear on the friction surfaces.

Figure 1:
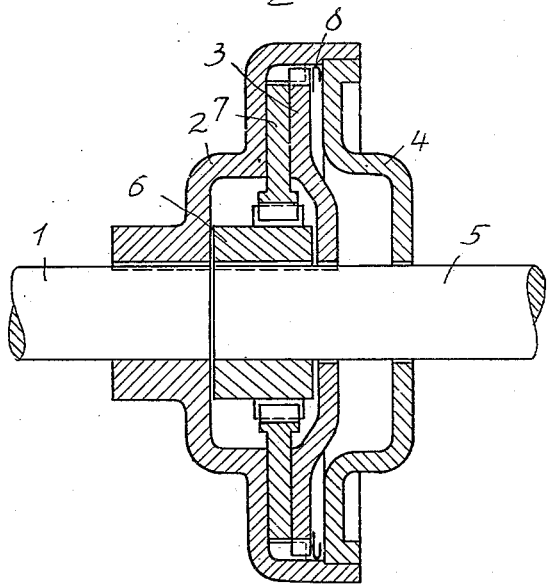
Figure 2:
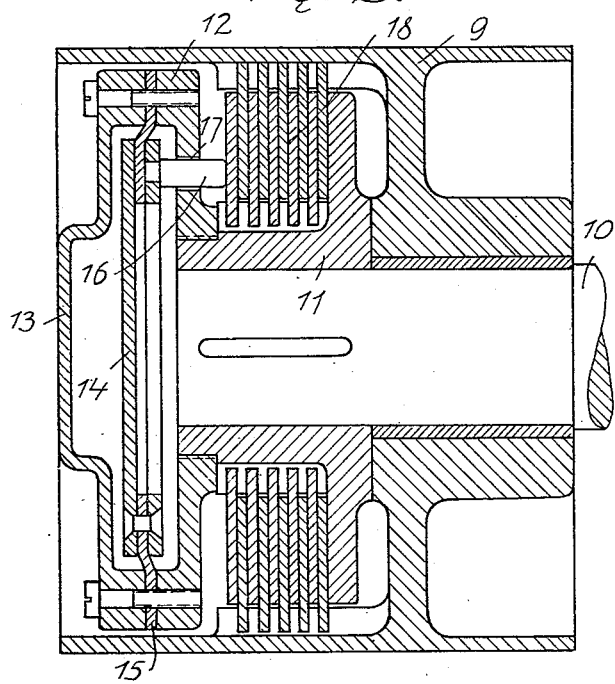

Two embodiments of the invention, each employed for a different use are shown by way of example, wherein Fig. 1 shows a shaft coupling; and Fig. 2 illustrates a coupling or clutch arranged within a belt pulley.

In the disclosure according to Fig. 1 the housing 2 together with one or more friction discs 3 and the cover 4, are mounted in such manner as to be carried by the drive shaft 1. The driven shaft 5 carries an entraining or actuating member 6, together with one or more friction discs 7. The cover 4 and the disc 3, which is preferably slidable axially, form the fluid chamber containing the fluid which, during rotation, generates the pressure necessary for the transmission of power through centrifugal force. It is of course obvious that the heavier the fluid, the greater the pressure and the transmission capacity, so that it follows that mercury is the most suitable fluid for use as the fluid medium. The yieldable partition 8 prevents escape of the fluid.

The operation of the coupling is as follows: On starting the clutch the fluid is carried along by the fluid chamber, and through its own centrifugal force it exerts pressure axially on the disc 3, which moves axially until the friction discs 3 and 7 and housing 2 contact with each other with sufficient force to enable the disc 7 to carry the load or work to the driven shaft 5.

An important feature of the invention resides in the novel construction of the fluid chamber. Ordinarily, the expansion or widening of the fluid chamber as a result of the axial displacement of the disc 3 causes the pressure of the rotating fluid ring to decrease, so that the clutch has less transmission capacity. Since there must be a certain intermediate space between the friction surfaces of discs 3 and 7 and the housing 2 at such times when the clutch is disengaged, and which space increases due to wear during operation, the decrease in transmission capacity is considerable over a period of time. In order to avoid this decrease in transmission as much as possible, the fluid chamber as shown in Fig. 1 is so constructed as to be considerably narrowed axially at the periphery and along the annular portion of the disc 3 which during operation of the clutch is pressed against by the rotating fluid ring. The fluid chamber thus enlarges sharply in an axial direction towards the center thereof. The object in so constructing the fluid chamber is to ensure that the fluid in the expanded portion will completely fill the outer completed portion of the chamber even on enlargement thereof, due to axial displacement of the disc 3, so that the pressure drop is inappreciable and not below the minimum limit necessary for proper operation. Accordingly, where the fluid chamber opens out into the central enlarged portion, the pressure will be sufficient to produce the required transmission capacity in the annular fluid ring produced by centrifugal force. With the fluid chamber disclosed it is also possible to produce maximum transmission capacity with the minimum quantity of fluid, so that this transmission capacity can be held within constant limits even when the friction surfaces were greatly worn. As a result of such structure, the space between the friction surfaces, caused by wear, need not be adjusted thereafter during the course of operation.

Fig. 2 shows a coupling constructed for starting motors, which must operate without load. Here the belt pulley is journalled rotatably on the drive shaft 10. The drive member 11, such as a dog or the like is rigidly keyed on the shaft and is connected with the fluid chamber by means such as the dog 12 mounted thereon. Inasmuch as in this case the space for the clutch is limited by the diameter of the belt pulley, the fluid chamber also has a limited diameter, and as a result the rotating fluid generates a slight pressure through its own centrifugal force.

If, however, the fluid chamber is formed by the cover 13 and the axially movable disc 14 mounted in such manner that it floats at one end of the shaft, a greater space for the fluid is provided, and a greater transmission power or capacity is obtained. The yieldable partition 15 prevents the fluid escaping from the chamber. Greater transmission capacity with small clutch dimensions is thus obtained by the floating arrangement of the fluid chamber.

The pressure produced by the centrifugal force of the fluid in the floating chamber is transmitted to the plates 18 by means such as pins 16 which are connected with the axially movable disc 14 and through openings or depressions in the dog 12 of the fluid chamber. The openings 17 in the dog 12 serve at the same time for guiding the pins. The belt pulley 9 is then driven directly by contact by the plates 18 mounted thereon with the corresponding plates mounted on the drive member 11, the contact between the respective plates being produced as stated before through the intermediary of the pin 16.

It is obvious that the invention is susceptible to numerous modifications and adaptations without departing from the spirit thereof, and it is intended that it be limited only by the scope of the appended claims.

I claim:

1. A friction clutch employing the centrifugal force of a liquid for the pressure for the transmission of power, comprising a driving shaft, a driven member, a pressure chamber containing liquid and mounted on the shaft for rotation therewith, said pressure chamber being restricted adjacent its periphery in stepwise relation to the enlarged central portion and comprising a cover member and an axially movable plate movable relative to the said cover, and means for transmitting the force from the movable plate to the driven member.

2. A friction clutch comprising a housing, and an axially slidable friction disc, the housing and the disc defining a fluid chamber, a drive shaft to which the housing is connected, a driven shaft, a friction disc mounted thereon, at least one of the housing and the first-mentioned friction disc being inset stepwise with respect to the other adjacent its periphery, whereby the fluid chamber is restricted adjacent its periphery in stepwise relation to the enlarged central portion, rotation of the drive shaft causing the fluid in the fluid chamber to exert pressure of substantially undiminished value regardless of wear on the first-mentioned friction disc, which in turn contacts with and transmits the pressure to the second-mentioned friction disc and thence to the driven shaft.

3. A friction clutch comprising a housing, and an axially slidable friction disc, the housing and the disc defining a fluid chamber, a drive shaft to which the housing is connected, the fluid chamber being arranged exteriorly to and adjacent one end of the drive shaft, a driven shaft, a friction disc mounted thereon, at least one of the housing and the first-mentioned friction disc being inset stepwise with respect to the other adjacent its periphery, whereby the fluid chamber is restricted adjacent its periphery in stepwise relation to the enlarged central portion, rotation of the drive shaft causing the fluid in the fluid chamber to exert pressure of substantially undiminished value regardless of wear on the first-mentioned friction disc, which in turn contacts with and transmits the pressure to the second-mentioned friction disc and thence to the driven shaft.

4. A friction clutch, comprising a housing, an axially slidable disc, the said housing and the said disc defining a fluid chamber, a drive shaft on which the said housing is mounted, the said housing having openings in the wall adjacent the drive shaft, and the said friction disc having rearwardly and axially extending pins passing through the axial openings, a driven annulus mounted about the driving shaft and the housing, clutch plates carried by the said annulus, clutch plates carried by the said driving shaft, and a fluid filling in the said fluid chamber, centrifugal force generated in the fluid due to rotation of the driving shaft moving the friction disc with its pins axially so that the pins cause pressure contact between the cooperating clutch plates.

In testimony whereof I affix my signature.

FRANTIŠEK GÖTZ.